United States Patent
Nakade et al.

(10) Patent No.: US 6,309,233 B1
(45) Date of Patent: Oct. 30, 2001

(54) REVOLVING CONNECTOR

(75) Inventors: Yoshiyuki Nakade; Ryoichi Taniuchi; Ichiro Tateishi; Takeo Nakamura; Naoaki Matsui, all of Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/640,987

(22) Filed: Aug. 18, 2000

(30) Foreign Application Priority Data

Aug. 18, 1999 (JP) .................................................. 11-231107

(51) Int. Cl.[7] ...................................................... H01R 3/00
(52) U.S. Cl. .............................................................. 439/164
(58) Field of Search ............................. 439/164, 15, 621, 439/622, 809, 326, 942

(56) References Cited

U.S. PATENT DOCUMENTS

| | | | | |
|---|---|---|---|---|
| 5,151,042 | * | 9/1992 | Okada ................................... | 439/169 |
| 5,205,754 | * | 4/1993 | Kuramoto ............................ | 439/164 |
| 5,238,420 | * | 8/1993 | Miyahara et al. .................... | 439/164 |
| 5,257,943 | | 11/1993 | Uno et al. . | |
| 5,286,219 | * | 2/1994 | Ueno et al. .......................... | 439/475 |
| 5,429,517 | * | 7/1995 | Bolen .................................... | 439/164 |
| 5,460,535 | * | 10/1995 | Bolen .................................... | 439/164 |
| 5,752,843 | * | 5/1998 | Kawamoto et al. .................. | 439/164 |
| 5,752,844 | * | 5/1998 | Kawamoto ........................... | 439/164 |
| 5,871,366 | | 2/1999 | Nishikigi et al. . | |
| 5,915,983 | * | 6/1999 | Ishikawa et al. .................... | 439/164 |
| 5,928,018 | * | 7/1999 | Dumoulin ............................ | 439/164 |
| 6,042,405 | * | 3/2000 | Masuda et al. ...................... | 439/164 |

\* cited by examiner

Primary Examiner—Gary Paumen
Assistant Examiner—Phuongchi Nguyen
(74) Attorney, Agent, or Firm—Wenderoth, Lind & Ponack L.L.P.

(57) ABSTRACT

A revolving connector includes an outer case having a housing section for accommodating a lower section of a fixed pin, an inner case having a holder for holding part of the fixed pin and being mounted to the outer case rotatably relative to the outer case, a stopper pin extending through the fixed pin and the housing section, and a flat cable coiled and housed in a space formed between the outer and inner cases, both the ends of the flat cable being fixed to the outer and inner cases, respectively. At its lower section, the fixed pin has an engaging hole through which the stopper pin extends and a slit communicating from the hole to an end face of the fixed pin, so that an elastic tip is formed at the lower section of the fixed pin. This structure allows the flat cable to maintain its neutral position not only at assembling but also at warehousing and transporting. This flexible flat cable is used in the revolving connector employed in a steering device of a car. The connector electrically couples the outer case and the inner case that is rotatable relative to the outer case.

13 Claims, 10 Drawing Sheets

FIG. 11   PRIOR ART

REVOLVING CONNECTOR

FIELD OF THE INVENTION

The present invention relates to a revolving connector using a flexible flat cable. This connector is employed in a steering device of an automobile and is expected to electrically connect an outer case to an inner case to be rotatable relative to the outer case of the steering device.

BACKGROUND OF THE INVENTION

A conventional revolving connector comprises the following elements:

(a) an outer case fixedly mounted to a steering column of a car;

(b) an inner case mounted to and revolving with a steering wheel; and (c) a flat cable electrically connecting the outer case with the inner case.

Figure 10:
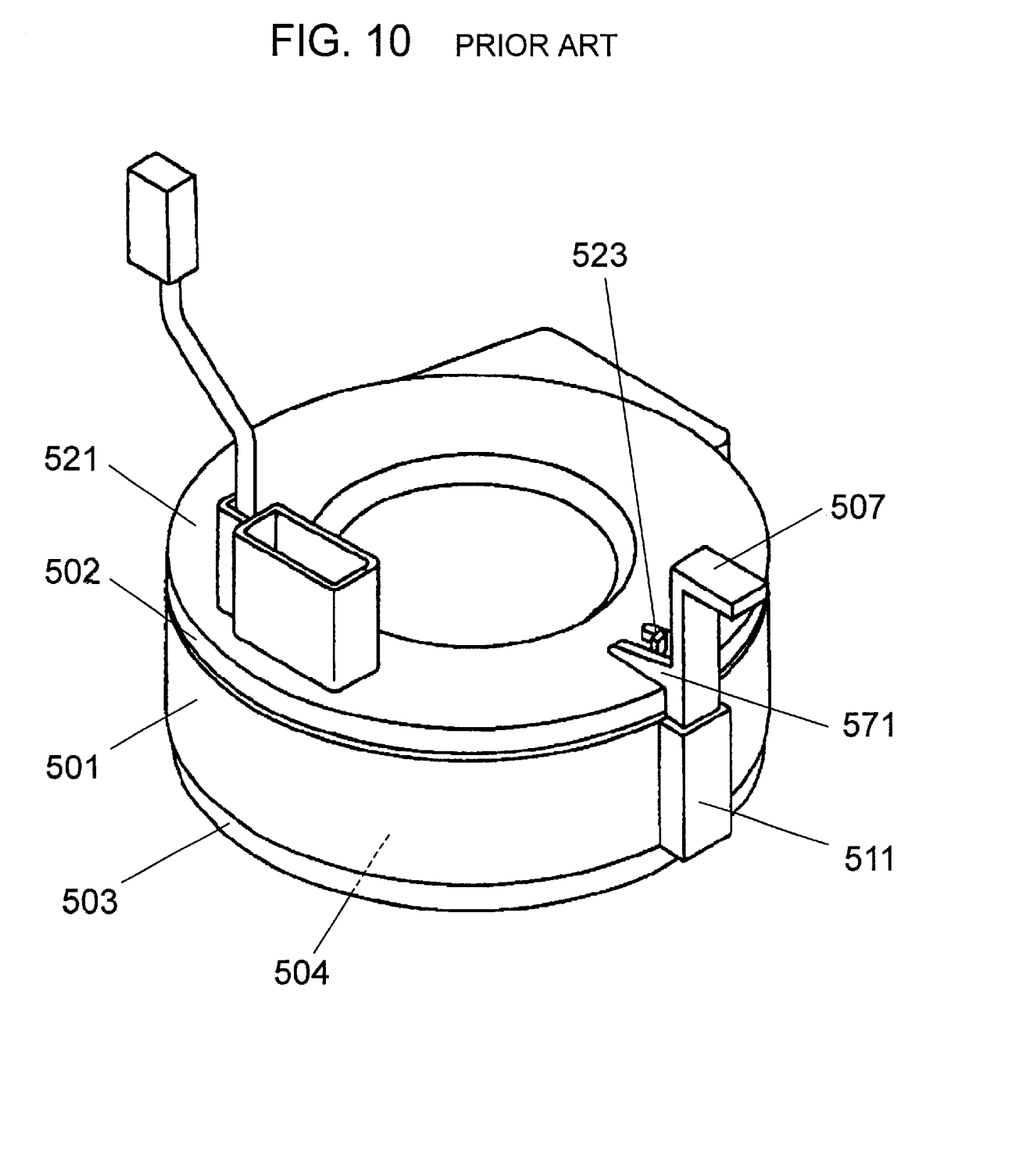
FIG. 10 is a perspective view of a conventional revolving connector.

This conventional revolving connector is described hereinafter with reference to FIGS. 10 and 11. FIG. 10 is a perspective view of the conventional revolving connector, and FIG. 11 is an exploded perspective view of the same connector.

Figure 11:
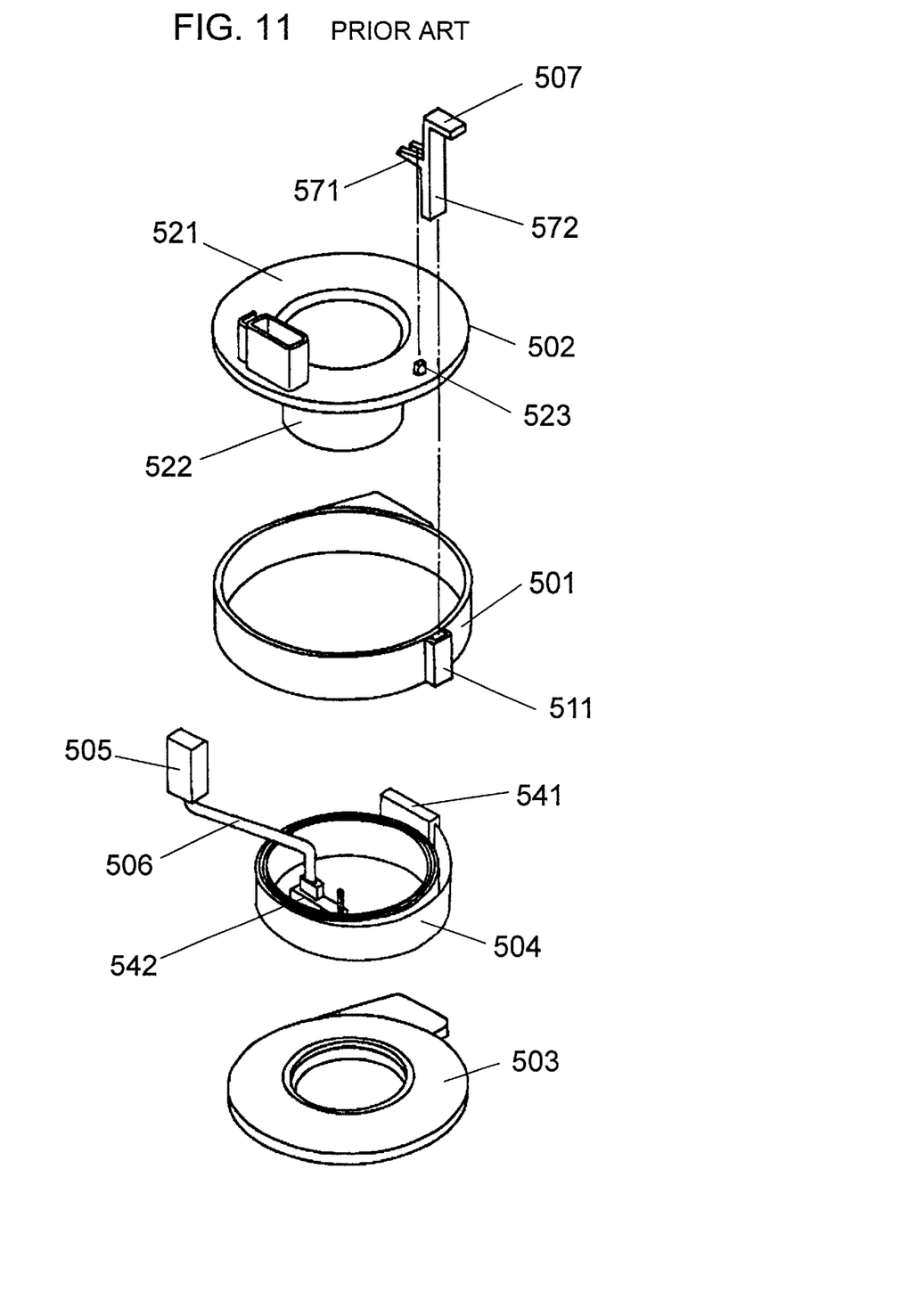
FIG. 11 is an exploded perspective of the same connector.

In FIG. 11, cylindrical outer case 501 has openings at upper and lower ends. Inner case 502 is housed by outer case 501 so that inner case 502 is rotatable relatively to outer case 501. Cover 503 covers the lower opening of outer case 501 and is fixedly mounted thereto. Inner case 502 has a lid 521 covering the upper opening of outer case 501 as well as an inner cylinder 522 protruding downward from center.

An annular space (not shown) formed between the inner wall of outer case 501 and the outer wall of inner cylinder 522 accommodates a flat cable 504. Flat cable 504 is a flexible belt-like cable incorporating a plurality of conductive wires. The cable coils a plurality of turns and has terminals 541 and 542 at both ends, respectively. Terminal 541 is fixed to outer case 501 and terminal 542 to inner case 502. Terminal 542 is coupled to a first end of a lead wire 506 whose second end is coupled to a connector 505.

The revolving connector structured above is mounted to a steering device of a car in the following manner. Outer case 501 is fixedly mounted to a steering column of a car (not shown). The steering wheel (not shown) is inserted into cylinder 522 of inner case 502 so that the steering wheel is mounted to inner case 502. Terminal 541 is coupled to an electronic circuit of the steering column on the car body. Connector 505, on the other hand, is coupled to an electronic circuit disposed in the steering wheel, so that the steering wheel is electrically coupled to the steering column.

The revolving of the steering wheel causes inner case 502 to rotate. When inner case 502 rotates counter-clockwise, cable 504 is urged outwardly and loosely coiled. When inner case 502 rotates clockwise, cable 504 is urged inwardly and tightly coiled.

The steering wheel that rotates as discussed above is electrically coupled with the steering column fixed to the car body by the cable 504 having a fixed length. Therefore, the cable 504 needs to be at a neutral position where a number of turns inwardly balances with that of the number of turns outwardly when the revolving connector is mounted to the steering device of the car in the straight-ahead position, so that the counter-clockwise rotation balances with the clockwise rotations.

When the connector is assembled, cable 504 is set in the neutral position, then a U-shaped tab 571 laterally extending from a fixed pin (pin) 507 is engaged with a holder 523 upwardly protruded from a lid 521 of inner case 502 as shown in FIGS. 10 and 11. At the same time, a lower section 572 of pin 507 is inserted into a box-type housing 511 disposed on the outer wall of outer case 501. As a result, inner case 502 is temporarily held not to rotate relative to outer case 501. Under this condition, the revolving connector is warehoused or transported, then pin 507 is upwardly pulled out just before or after the revolving connector is mounted to the steering device, so that the characteristic discussed above of the conventional connector is obtained.

However, if pin 507 is pulled out by mistake and inner case 502 rotates to miss the neutral position in a warehouse, pin 507 can still be restored. Therefore, when mounting the revolving connector to the steering device, it is yet doubtful whether or not cable 504 is in the neutral position even pin 507 is in place.

SUMMARY OF THE INVENTION

The present invention addresses the problem discussed above and aims to provide a revolving connector in which a neutral position of a flat cable is assured. The revolving connector of the present invention comprises the following elements:

(a) a cylindrical outer case with a housing section on its outer wall and having an upper-end-opening;

(b) an inner case mounted to and being rotatable relative to the outer case, and having a holder at its upper face;

(c) a flexible flat cable coiled and accommodated in a space formed between an outer wall of a cylinder protruded to the center of either one of the outer case or the inner case and an inner wall of either one of the inner case or the outer case, and both ends of the flexible flat cable are fixed to the outer case and the inner case, respectively;

(d) a fixed pin having its middle part held by the holder and its lower section inserted into the housing section, so that the rotation between both the cases is regulated, the pin having an engaging hole and a slit provided near the center of the inserted end, the slit communicating from the engaging hole to a lateral face, so that an elastic tip is formed at part of the lower section; and (e) a stopper pin extending through the engaging hole and the housing section.

Another revolving connector of the present invention comprises the following elements:

(a) a cylindrical outer case with a housing section on its outer wall and having an upper-endopening;

(b) an inner case mounted to and being rotatable relative to the outer case, and having a holder at its upper face;

(c) a flexible flat cable coiled and accommodated in a space formed between an outer wall of a cylinder protruded to the center of either one of the outer case or the inner case and an inner wall of either one of the inner case or the outer case, and both the ends of the cable are fixed to the outer case and the inner case, respectively;

(d) a fixed pin having its middle part held by the holder and lower section inserted into the housing section, so that the rotation between both the cases is regulated, the pin having an engaging hole and a slit provided near the center of the inserted end, the slit communicating from the engaging hole to a lower end, so that an elastic tip divided into two sections is provided at part of the lower section; and (e) a stopper pin extending through the engaging hole and the housing section, and at least one side of the pin is wider than the slit's width.

Still another revolving connector of the present invention comprises the following elements:
(a) an outer case with a housing section for accommodating an end of a fixed pin;
(b) an inner case mounted to the outer case to be rotatable relative to the outer case, and having a holder for holding part of the fixed pin;
(c) a stopper pin extending through the fixed pin and the housing section;
(d) a flat cable coiled to be accommodated in a space formed between the outer case and inner case, both the ends of the cable are fixed to the outer case and the inner case, respectively.

In this structure, the fixed pin includes an engaging hole through which the stopper pin extends, and a slit communicating from the engaging hole to an end face, so that an elastic tip is formed.

In any type of the revolving connectors discussed above, the stopper pin extends through the engaging hole of the fixed pin and the housing section of the outer case, so that the relative revolving between the outer case and inner case is regulated, and the neutral position of the flat cable is secured.

DETAILED DESCRIPTION OF THE INVENTION

The exemplary embodiments of the present invention are demonstrated hereinafter with reference to the accompanying drawings.
(Exemplary Embodiment 1)

Figure 1:
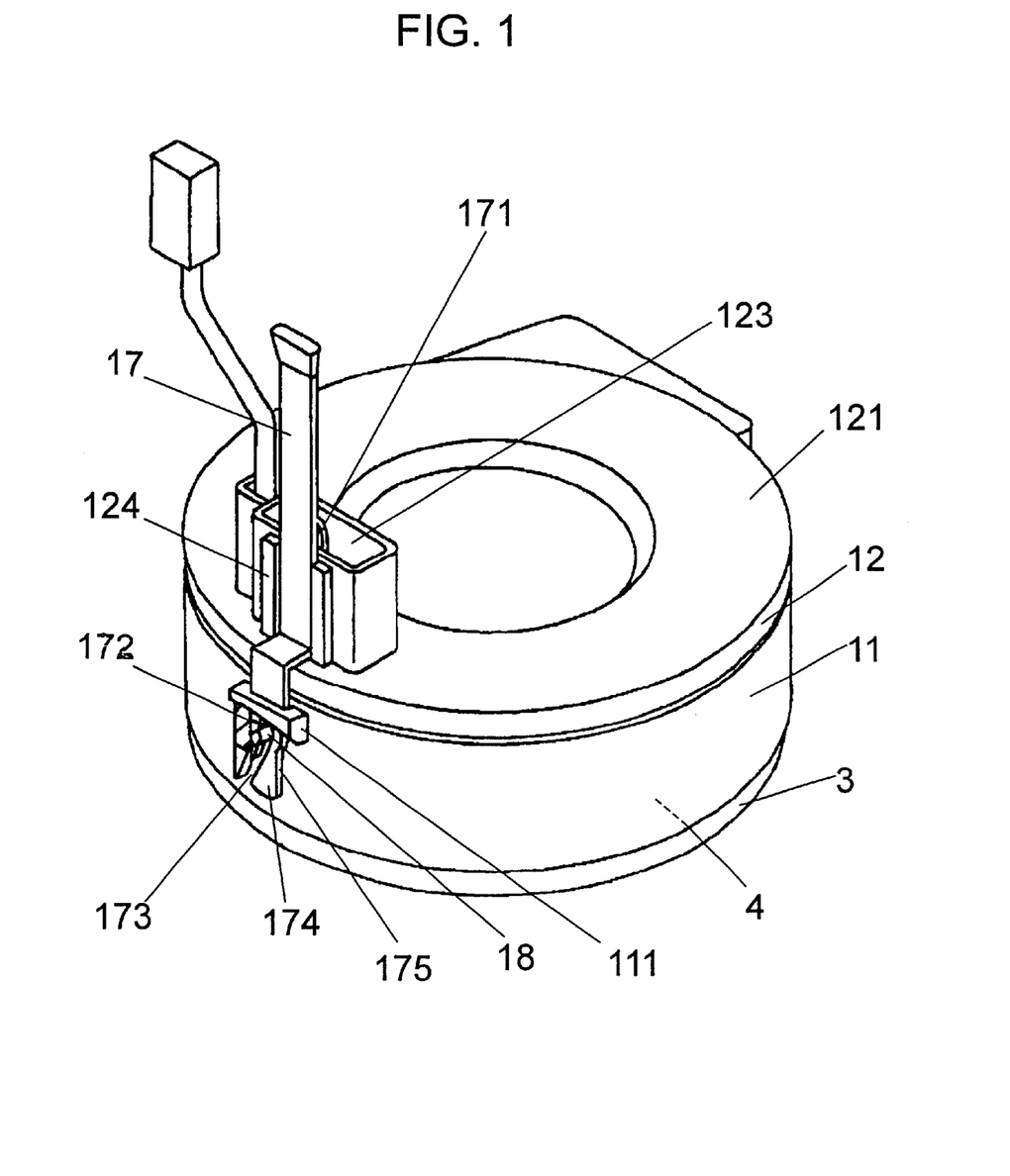
FIG. 1 is a perspective view of a revolving connector in accordance with a first exemplary embodiment of the present invention.
Figure 2:
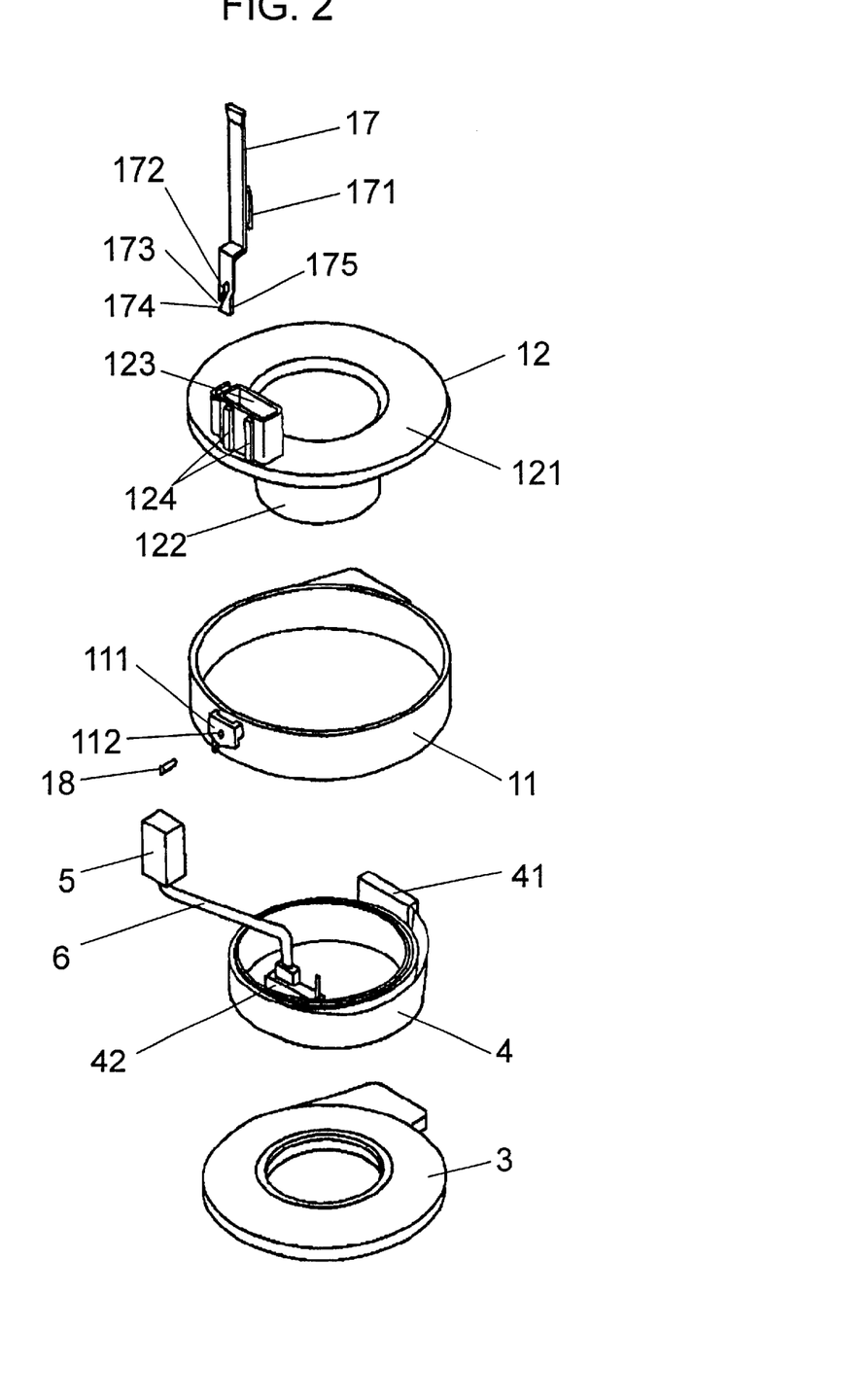
FIG. 2 is an exploded perspective view of the same connector.

FIG. 1 is a perspective view of a revolving connector in accordance with the first exemplary embodiment of the present invention. FIG. 2 is an exploded perspective view of the same connector.

In FIG. 2, a cylindrical outer case 11 has openings at both upper and lower ends thereof The outer case 11 houses an inner case 12 so that inner case 12 can revolve relative to outer case 11. Cover 3 is fixed to outer case 11 and covers the lower end of the outer case 11. Inner case 12 comprises a lid 121 covering the upper end of the outer case 11 and a cylinder 122 protruded toward the center of the lower surface.

A ring-shaped space (not shown) formed between the inner wall of outer case 11 and the outer wall of inner cylinder 122 accommodates flat cable 4. Flat cable 4 is a flexible belt-like cable incorporating a plurality of conductive wires. The cable coils a plurality of turns and has terminals 41 and 42 at both the ends thereof Terminal 41 is fixed to outer case 11 and terminal 42 to inner case 12. Terminal 42 is coupled to a first end of a lead wire 6 of which its second end is coupled to a connector 5.

The structure discussed above is the same as that of the conventional connector. However, the following elements are used in this first embodiment in addition to the elements in the conventional one.

On the outer wall of outer case 11, a box type housing section 111 having an opening at its upper end is disposed. On the upper face of lid 121 of inner case 12, a receptor 123 for receiving a connector from an electronic circuit in a steering wheel is disposed. On the outer wall of receptor 123, a parallel rail-shaped holder 124 is provided, and a hook-shaped engaging section 171 disposed at a middle part of a fixed pin 17 is held by a holder 124. A lower section of fixed pin 17 is inserted into housing section 111 for temporal tacking, so that inner case 12 will not rotate relative to outer case 11.

Figure 3:
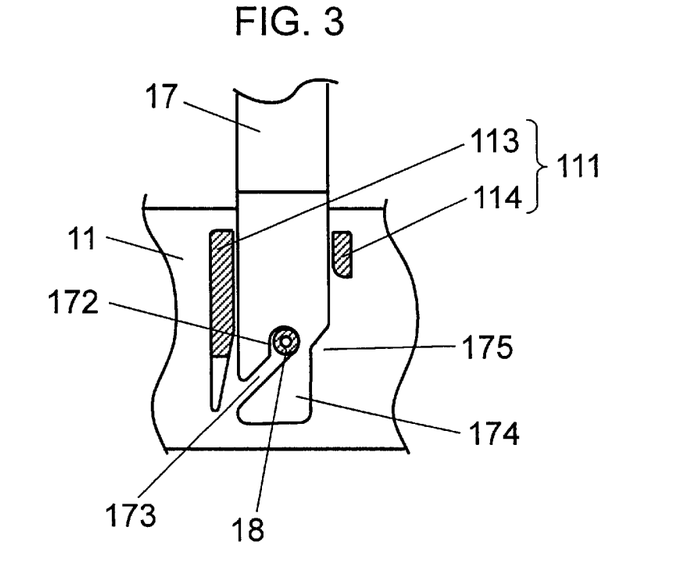
FIG. 3 is a partial cross section of a housing section of the same connector.

FIG. 3 is a partial cross section of the housing section. Fixed pin 17 is detailed hereinafter with reference to FIG. 3. Fixed pin 17 is made of an elastic and thermoplastic resin such as polypropylene, polyethylene, or polyamide etc. On the lower section inserted into housing section 111, an engaging hole 172 is punched around the center, and a slit 173 communicating from the hole 172 to the lower left side is provided, thereby forming an elastic and roughly triangular tip 174. On the right hand side of tip 174, a notch 175 is formed.

Figure 4:
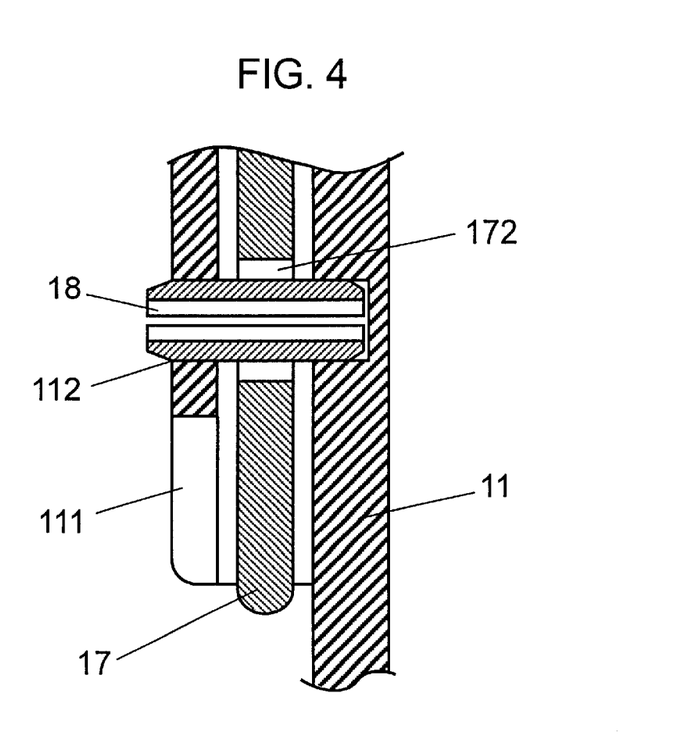
FIG. 4 is a lateral cross section of the same housing section.

FIG. 4 is a lateral cross section of what is shown in FIG. 3. As FIG. 4 shows, a stopper pin 18 made of a metal hollow cylinder with a slot extends through engaging hole 172 of fixed pin 17 from a hole 112 of housing section 111. The tip of fixed pin 17 is inserted into outer case 11, so that the revolving connector is assembled.

When the revolving connector as structured above is assembled, cable 4 is set at a neutral position where the number of turns on outer wall of inner cylinder 122 and inner wall of outer case 11 are equal. Then engaging section 171 of pin 17 is held by holder 124 of inner case 12, and the lower section of pin 17 is inserted into housing section 111. After that, stopper pin 18 is extended through hole 112 of outer case 11 and engaging hole 172 of pin 17 for temporal tacking, so that inner case 12 will not revolve (rotate). The revolving connector is warehoused or transported in this condition.

Outer case 11 is fixed to a steering column (not shown) of a car at the straight-ahead position, then a steering wheel (not shown) is inserted into inner cylinder 122 of inner case 12, so that the revolving connector is mounted to a steering device of the car. Fixed pin 17 is then upwardly pulled out, and terminal 41 of cable 4 fixed to outer case 11 is coupled to an electronic circuit of the steering column on the car side, connector 5 coupled to terminal 42 fixed to inner case 12 via lead wire 6 is coupled to an electronic circuit in the steering wheel. As a result, the steering wheel is electrically coupled with the steering column.

Figure 5A:
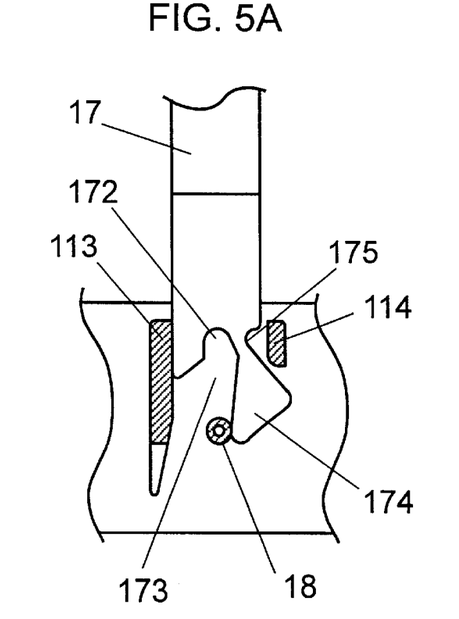
FIG. 5A through FIG. 5D are partial cross sections illustrating a fixed pin being pulled out from the same housing section.

A way of inserting and pulling out fixed pin 17 is demonstrated hereinafter. First, pin 17 at the fixed position is upwardly pulled as shown in FIG. 5A, then, being in contact with stopper pin 18, slides from engaging hole 172 to slit 173. Left side wall 113 of box-type housing section 111 of outer case 11 is long and extends downward and right side wall 114 is shorter (in this embodiment the length of wall 114 is a quarter of the length of the wall 113). This structure allows the elastic tip 174 having a notch 175 at a right side to open rightward as shown in FIG. 5B.

Figure 5B:
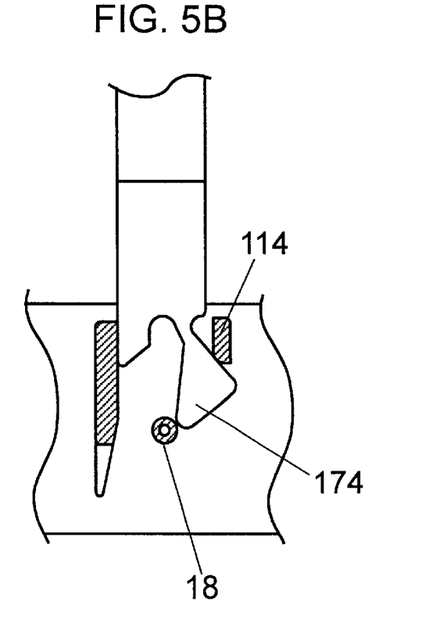
Figure 5C:
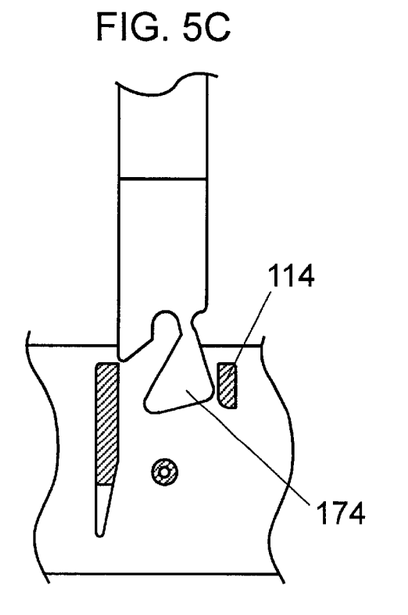
Figure 5D:
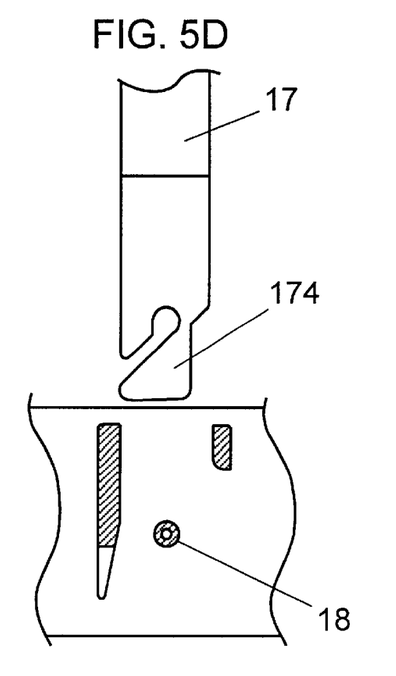

The lower end of elastic tip 174 is now in a position contacting with stopper pin 18 and the right lateral face is contacting with right side wall 114 as shown in FIG. 5B. Pin 17 is then further pulled upwardly to slide the right lateral face along wall 114, and tip 174 is being restored toward its original position while entire pin 17 moves upwardly as shown in FIG. 5C. Finally, as shown in FIG. 5D, when fixed pin 17 is completely pulled out, elastic tip 174 restores itself substantially.

Figure 6A:
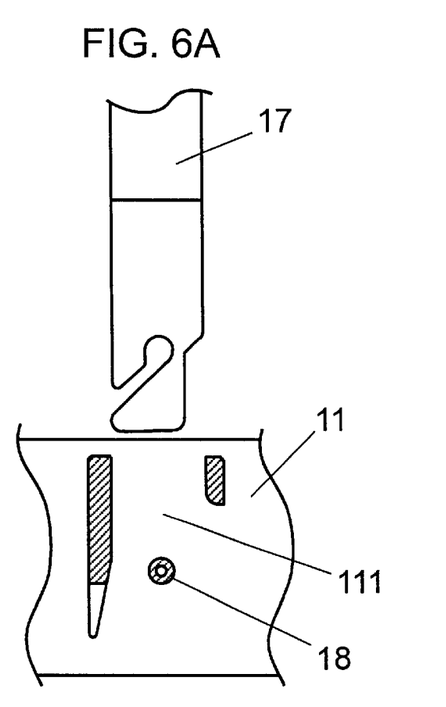
FIG. 6A through FIG. 6C are partial cross sections illustrating the fixed pin being inserted into the same housing section.
Figure 6B:
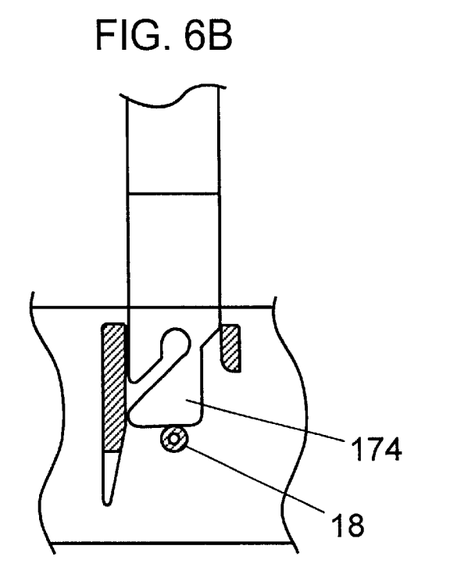
Figure 6C:
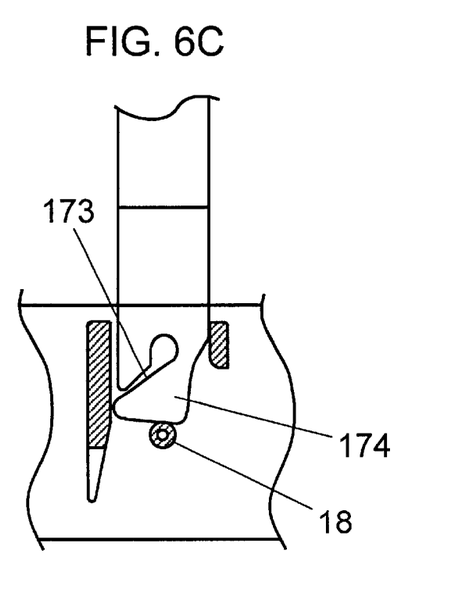

When fixed pin 17 once pulled out (FIG. 6A) is attempted to be inserted into housing section 111 again, the lower end of elastic tip 174 is blocked by stopper pin 18 as shown in FIG. 6B, so that pin 17 cannot be inserted because stopper pin 18 has remained at housing section 111. If the pin is further pushed down as shown in FIG. 6C, elastic tip 174 only deforms within slit 173. As a result, this structure does not allow pin 17 to be inserted into housing section 111 again.

The first embodiment proves that fixed pin 17 can be pulled out. However, pin 17 once pulled out cannot be inserted again into housing section 111 of outer case 11. Therefore, the structure discussed above prevents fixed pin 17 from being mounted to the revolving connector when a neutral position of the flat cable is lost. As a result, a revolving connector securing the neutral position of cable 4 is obtainable.

Once fixed pin 17 is pulled out, stopper pin 18 remains at housing section 111. Therefore, a visual check of presence of stopper pin 18 can verify with ease whether or not fixed pin 17 has been pulled out from the housing section in a warehouse or during transport of the revolving connector.

Since notch 175 is formed at the right lateral face of elastic tip 174 of pin 17, tip 174 is elastically deformed with a little force, so that pin 17 can be pulled out from housing section 111 with ease.

Figure 7:
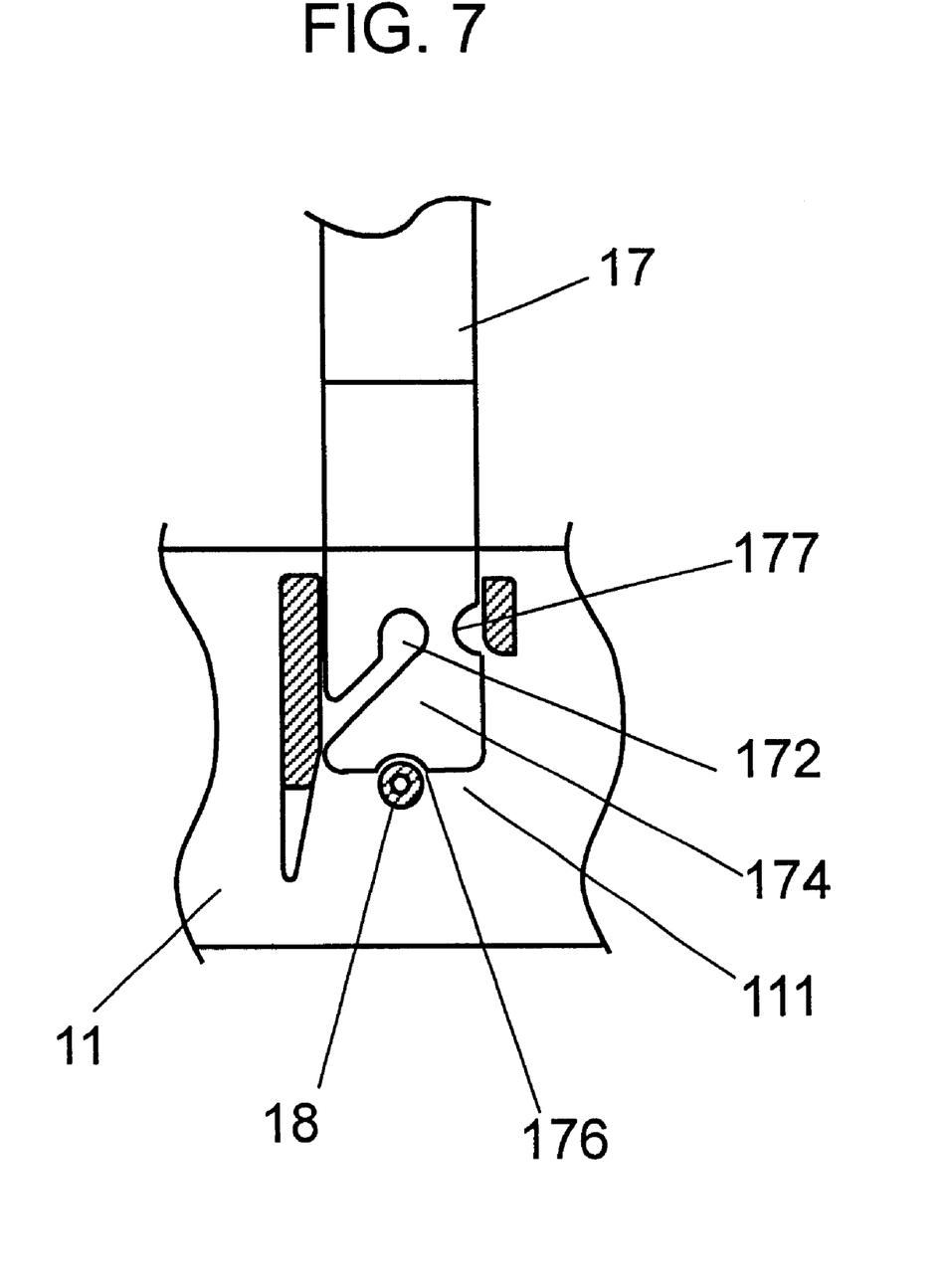
FIG. 7 is a partial cross section of the fixed pin of which its lower section has a recess.

Further as shown in FIG. 7, recess 176 having a slightly greater diameter than that of stopper pin is provided at the lower end of elastic tip 174, so that when pin 17 is attempted to be inserted again into housing section 111, stopper pin 18 catches recess 176. As a result, pin 17 is harder to insert into housing section 111.

As discussed above, the first exemplary embodiment proves that the fixed pin can be pulled out because the elastic tip at the lower section of the fixed pin is deformed elastically. However, the pin once pulled out cannot be inserted again to the housing section of the outer case because the stopper pin extending through the housing section blocks the lower end of the tip. Therefore, this structure prevents the fixed pin from being mounted to the revolving connector which has lost the neutral position of the flat cable. As a result, this structure allows for the neutral position of the flat cable in the revolving connector to be maintained.

In the discussion above, the following structure is used. The slit 173 communicating from engaging hole 172 near the fixed pin center to the lower left side is formed at the lower section of pin 17, so that elastic tip 174 is shaped as a rough triangle is formed. Tip 174 has notch 175 on its right lateral face. However, the slit can be formed at left or upper left side, and the elastic tip may be in a rough 'L' shape. Another configuration is, as shown in FIG. 7, that notch 177 can be more locally formed.

Exemplary Embodiment 2)

The second exemplary embodiment differs from the first embodiment in the shape of the fixed pin. FIG. 8A through FIG. 8D are partial cross sections of the fixed pin, and FIG. 9 is a partial cross section of the same fixed pin being inserted.

Figure 8A:
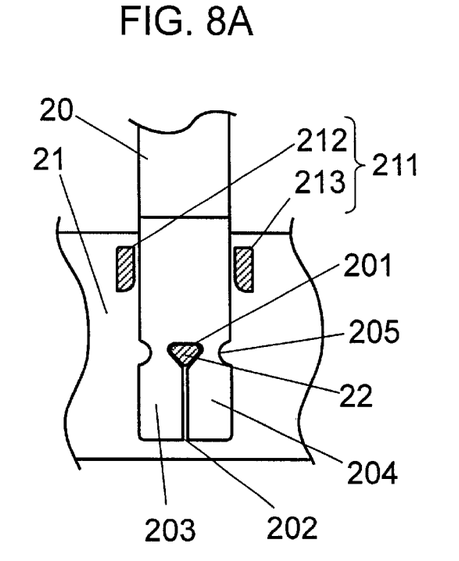
FIG. 8A through FIG. 8D are partial cross sections of a fixed pin of a revolving connector in accordance with a second exemplary embodiment of the present invention.
Figure 9:
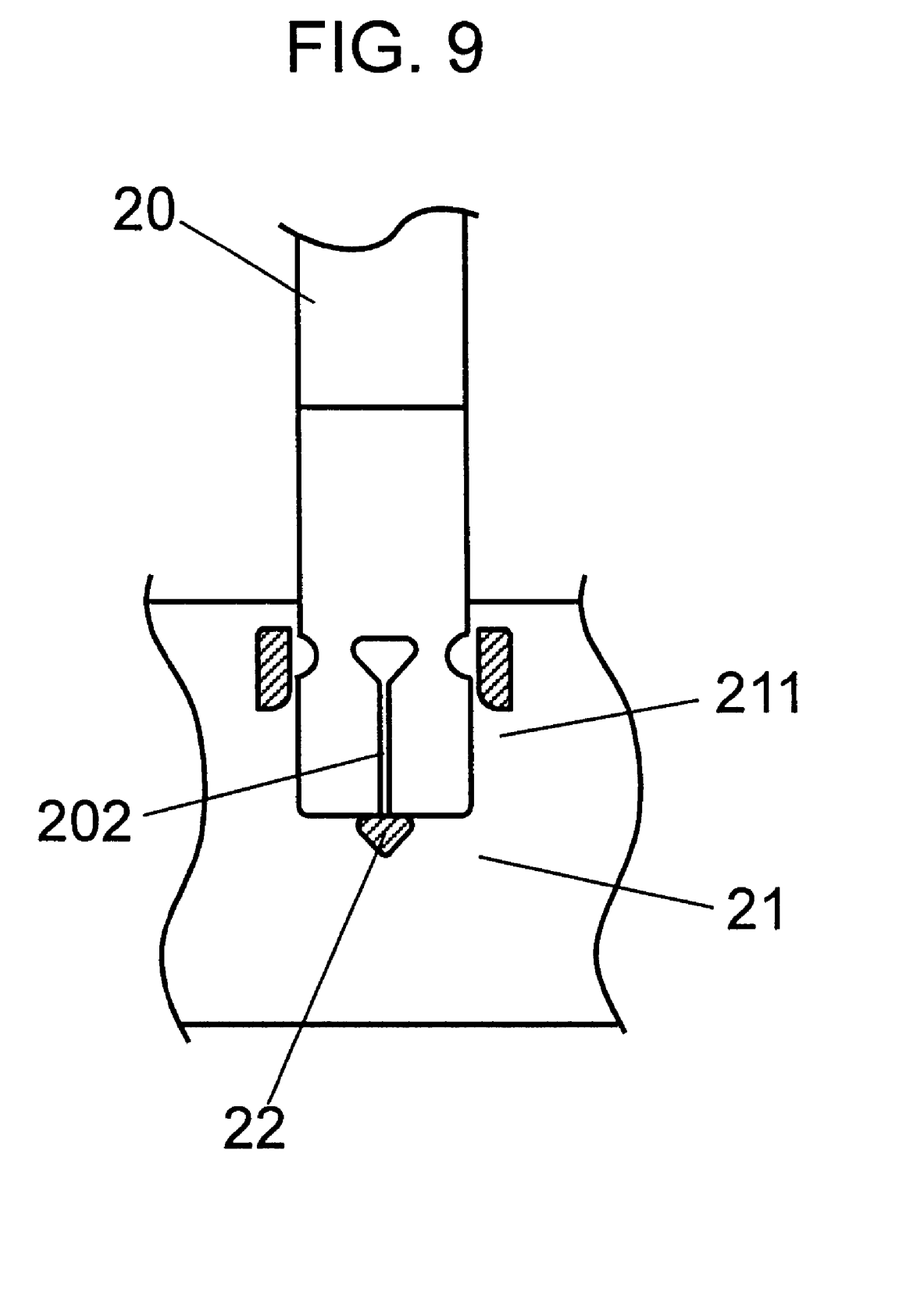
FIG. 9 is a partial cross section of the fixed pin being inserted.

As shown in FIG. 8A, an engaging hole 201 is provided around the center of a lower section of a fixed pin (pin) 20, and a slit 202 communicates from hole 201 to the lower end. This slit divides the lower section of pin 20 into two sections, i.e. elastic tips 203 and 204. Notches 205 are formed on both sides of engaging hole 201, and fixed pin 20 is inserted into a housing section 211 of an outer case 21. Stopper pin 22 of which its bottom side is greater than slit 202, i.e. pin 22 is shaped as an inverted triangle, extends through engaging hole 201.

The result of pulling out fixed pin 20 is demonstrated hereinafter.

Figure 8B:
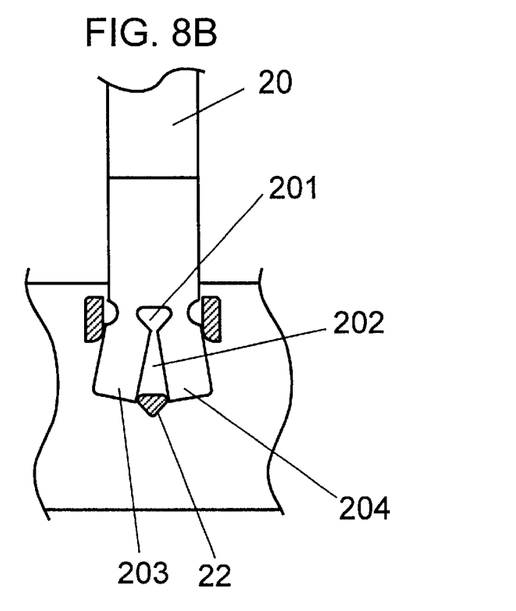

Side wall 212 of housing section 211 is as short as a side wall 213 as shown in FIG. 8A. Fixed pin 20, when pulled upwardly as shown in FIG. 8B, slides from hole 201 to slit 202, maintaining contact with stopper pin 22, and elastic tips 203 and 204 flare to both sides to elastically deform.

Figure 8C:
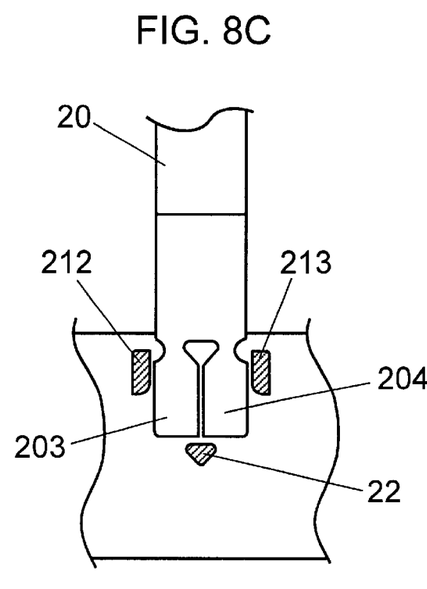
Figure 8D:
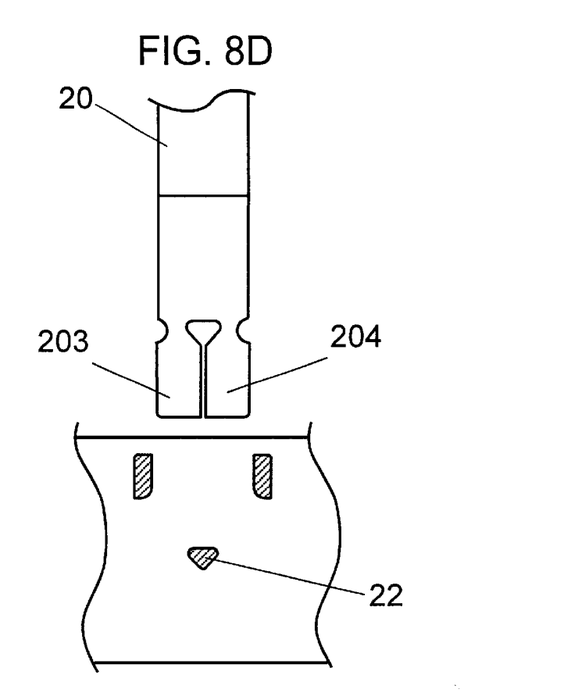

When pin 20 is further pulled upwardly, elastic tips 203 and 204 slide along both side walls 212 and 213, thereby restoring themselves to the original form as moving upwardly (FIG. 8C). Finally, as shown in FIG. 8D, when pin 20 is completely pulled out, elastic tips 203 and 204 are almost restored to the original form.

When the fixed pin once pulled out is attempted to be inserted into housing section 211 again, the lower end of the fixed pin is blocked by stopper pin 22 as shown in FIG. 9. Pin 20 thus cannot be inserted again because stopper pin 22 shaped as the inverse triangle, i.e. the bottom side is wider than slit 202, has remained at housing section 211.

As discussed above, slit 202 communicating from engaging hole 201 near the center of the lower section of fixed pin 20 to the lower end of fixed pin 20 is provided to form divided elastic tips 203 and 204. Stopper pin 22 shaped as the inverse triangle extends through engaging hole 201 of fixed pin 20. This structure prevents fixed pin 20 from being mounted again to the revolving connector that has lost the neutral position, and realizes the revolving connector maintaining the neutral position of the flat cable.

Stopper pin 22 can be shaped in not only the inverse triangle, but also other rectangular forms such as a trapezoid, which has a greater side than slit 202 and this side blocks fixed pin 20. The trapezoid can produce the same effect as far as fixed pin 20 can be pulled out.

The descriptions discussed above prove that the structures of the present invention allow a revolving connector to maintain the neutral position of the flat cable.

What is claimed is:

1. A revolving connector comprising:

a cylindrical outer case having an outer wall and a housing section on said outer wall, said housing section having an open upper end;

an inner case having an upper face and a holder positioned on the upper face of said inner case, wherein said inner case is disposed on said cylindrical outer case such that said inner case is rotatable relative to said cylindrical outer case;

an inner cylinder having an outer wall, said inner cylinder aligned with a center of one of said cylindrical outer case and said inner case;

a coiled flexible flat cable housed in a space formed between said outer wall of said inner cylinder and an inner wall of one of said inner case and said cylindrical outer case, wherein one end of said flexible flat cable is fixed to said cylindrical outer case and another end of said flexible flat cable is fixed to said inner case, respectively;

a pin having a middle section held by said holder and a lower section inserted into said housing section so that revolving between said cylindrical outer case and said inner case is regulated, said pin also having an engaging hole near a center of the lower section and a slit in the lower section, the slit extending from the engaging hole to a side of said pin and forming an elastic tip on part of said pin; and a stopper pin extending through the engaging hole and said housing section.

2. The revolving connector as defined in claim 1, wherein said pin has a recess having a slightly greater diameter than that of said stopper pin, the recess being formed on the lower end of said pin.

3. The revolving connector as defined in claim 1, wherein said pin has a notch, the notch being formed on a lateral face of a tip of said pin.

4. The revolving connector as defined in claim 3, wherein said pin has a recess having a slightly greater diameter than that of said stopper pin, the recess being formed on the lower end of said pin.

5. A revolving connector comprising:

a cylindrical outer case having an outer wall and a housing section on said outer wall, said housing section having an open upper end;

an inner case having an upper face and a holder positioned on the upper face of said inner case, wherein said inner case is disposed on said cylindrical outer case such that said inner case is rotatable relative to said cylindrical outer case;

an inner cylinder having an outer wall, said inner cylinder aligned with a center of one of said cylindrical outer case and said inner case;

a coiled flexible flat cable housed in a space formed between said outer wall of said inner cylinder and an inner wall of one of said inner case and said cylindrical outer case, wherein one end of said flexible flat cable is fixed to said cylindrical outer case and another end of said flexible flat cable is fixed to said inner case, respectively;

a pin having a middle section held by said holder and a lower section inserted into said housing section so that revolving between said cylindrical outer case and said inner case is regulated, said pin also having an engaging hole near a center of the lower section and a slit in the lower section, the slit extending from the engaging hole to a lower end of said pin and forming divided elastic tips in the lower end of said pin; and a stopper pin extending through the engaging hole and said housing section, wherein at least one side of said stopper pin is greater than a width of the slit.

6. The revolving connector as defined in claim 5, wherein said pin has a recess having a slightly greater diameter than that of said stopper pin, the recess being formed on the lower end of said pin.

7. The revolving connector as defined in claim 5, wherein said pin has a notch, the notch being formed on a lateral face of a tip of said pin.

8. The revolving connector as defined in claim 7, wherein said pin has a recess having a slightly greater diameter than that of said stopper pin, the recess being formed on the lower end of said pin.

9. A revolving connector comprising:

a pin having a lower section;

an outer case having a housing section to accommodate the lower section of said pin;

an inner case having a holder to hold a part of said pin, said inner case being disposed on said outer case and rotatable relative thereto;

a stopper pin extending through said pin and said housing section; and a coiled flat cable housed in a space formed between said outer case and said inner case, wherein one end of said flat cable is fixed to said outer case and another end of said flat cable is fixed to said inner case, respectively, wherein the lower section of said pin housed by said housing section has an engaging hole, said stopper pin extends through the engaging hole, and said pin also has a slit extending from the engaging hole to an end face of said pin, thereby forming an elastic tip.

10. The revolving connector as defined in claim 9, wherein the slit extends from the engaging hole to a side end of said pin, thereby forming the elastic tip at a lower end of the pin, the elastic tip being shaped as one of a triangle shape and an 'L' shape.

11. The revolving connector as defined in claim 9, wherein the slit extends from the engaging hole to the lower end of said pin to form two divided elastic tips.

12. The revolving connector as defined in claim 11, wherein said stopper pin has one side greater than a slit width of the slit.

13. The revolving connector as defined in claim 12, wherein said stopper pin is shaped as one of an inverse triangle and a rectangle.

* * * * *